United States Patent
Do et al.

(10) Patent No.: US 11,891,048 B2
(45) Date of Patent: Feb. 6, 2024

(54) METHOD FOR GENERATING A SETPOINT FOR THE COMBINED CONTROL OF A WHEEL-STEERING SYSTEM AND OF A DIFFERENTIAL BRAKING SYSTEM OF A MOTOR VEHICLE

(71) Applicants: Renault s.a.s., Boulogne-Billancourt (FR); NISSAN MOTOR CO., LTD., Yokohama (JP)

(72) Inventors: Anh Lam Do, Chaville (FR); Alain Haddad, Montigny le bretonneux (FR); Geoffrey Bruno, Issy les Moulineaux (FR); Khoa Duc Nguyen, Sartrouville (FR)

(73) Assignees: Renault s.a.s., Boulogne-Billancourt (FR); NISSAN MOTOR CO., LTD., Yokohama (JP)

( * ) Notice: Subject to any disclaimer, the term of this patent is extended or adjusted under 35 U.S.C. 154(b) by 187 days.

(21) Appl. No.: 17/437,587

(22) PCT Filed: Feb. 27, 2020

(86) PCT No.: PCT/EP2020/055120
§ 371 (c)(1),
(2) Date: Sep. 9, 2021

(87) PCT Pub. No.: WO2020/182480
PCT Pub. Date: Sep. 17, 2020

(65) Prior Publication Data
US 2022/0144249 A1    May 12, 2022

(30) Foreign Application Priority Data
Mar. 12, 2019   (FR) .................................... 19 02510

(51) Int. Cl.
*B60W 30/045*    (2012.01)
*B60T 8/1755*    (2006.01)
(Continued)

(52) U.S. Cl.
CPC ....... *B60W 30/045* (2013.01); *B60T 8/17551* (2013.01); *B60W 10/184* (2013.01);
(Continued)

(58) Field of Classification Search
CPC .. B60W 30/045; B60W 10/184; B60W 10/20; B60W 2400/00; B60W 2520/10;
(Continued)

(56) References Cited

U.S. PATENT DOCUMENTS 9,925,988 B1   3/2018  Zwicky et al.
2006/0086543 A1   4/2006  Motoyama
(Continued)

FOREIGN PATENT DOCUMENTS

CN    101062676 A  * 10/2007  .......... B60T 8/17551
EP    1 650 096 A2    4/2006
(Continued)

OTHER PUBLICATIONS

International Search Report dated May 13, 2020 in PCT/EP2020/055120 filed Feb. 27, 2020, 2 pages.

*Primary Examiner* — B M M Hannan
(74) *Attorney, Agent, or Firm* — Oblon, McClelland, Maier & Neustadt, L.L.P.

(57) ABSTRACT

A method generates a setpoint for controlling a steering system and a differential braking system of a motor vehicle. The method includes: acquiring a value relating to a total yawing moment to be applied to the motor vehicle such that it follows a required path, and the speed of the motor vehicle, calculating, as a function of the speed, at least one threshold relating to the maximum proportion of the total (Continued)

yawing moment that the steering system or that the differential braking system can provide, determining, as a function of the threshold, a distribution rate relating to the proportion of the total yawing moment that the steering system or that the differential braking system must provide, and generating a setpoint for controlling the steering system and the differential braking system as a function of the distribution rate and of the value relating to the total yawing moment.

13 Claims, 2 Drawing Sheets

(51) Int. Cl.
  *B60W 10/184*  (2012.01)
  *B60W 10/20*  (2006.01)
  *B62D 7/15*  (2006.01)

(52) U.S. Cl.
  CPC ............ *B60W 10/20* (2013.01); *B62D 7/159* (2013.01); *B60T 2260/022* (2013.01); *B60W 2400/00* (2013.01); *B60W 2520/10* (2013.01); *B60W 2520/14* (2013.01); *B60W 2554/80* (2020.02); *B60W 2710/18* (2013.01)

(58) Field of Classification Search
  CPC ......... B60W 2520/14; B60W 2554/80; B60W 2710/18; B60W 2720/14; B60W 2720/40; B60W 30/10; B60W 40/114; B60W 2510/205; B60W 2530/10; B60W 2540/18; B60W 2552/50; B60T 8/17551; B60T 2260/022; B60T 2260/02; B60T 8/17558; B62D 7/159; B62D 9/005; B62D 15/025; B62D 15/0265
  USPC ......................................................... 701/41
  See application file for complete search history.

(56) References Cited

U.S. PATENT DOCUMENTS

| | | | | |
|---|---|---|---|---|
| 2008/0172153 | A1* | 7/2008 | Ozaki | ................ B60T 8/17557 |
| | | | | 701/41 |
| 2011/0276227 | A1 | 11/2011 | Sugawara et al. | |
| 2012/0283907 | A1* | 11/2012 | Lee | ..................... B60T 8/17557 |
| | | | | 701/32.9 |
| 2013/0144476 | A1* | 6/2013 | Pinto | .................. B60T 8/17555 |
| | | | | 903/930 |
| 2016/0236679 | A1 | 8/2016 | Inoue et al. | |
| 2017/0115662 | A1* | 4/2017 | Mori | .................... G07C 5/0808 |
| 2017/0351262 | A1* | 12/2017 | Suzuki | ................ G05D 1/0257 |

FOREIGN PATENT DOCUMENTS

| | | | |
|---|---|---|---|
| EP | 2 338 758 A1 | 6/2011 | |
| FR | 3088275 A1 * | 5/2020 | ......... B60R 21/0134 |

* cited by examiner

METHOD FOR GENERATING A SETPOINT FOR THE COMBINED CONTROL OF A WHEEL-STEERING SYSTEM AND OF A DIFFERENTIAL BRAKING SYSTEM OF A MOTOR VEHICLE

TECHNICAL FIELD OF THE INVENTION

The present invention generally relates to motor vehicle driving aids.

It relates more particularly to a method for generating a setpoint for controlling a steering system and a differential braking system of a motor vehicle.

PRIOR ART

With a view to motor vehicle safety, vehicles are currently equipped with driving assistance systems or with an autonomous driving system.

These systems are known to include in particular automatic emergency braking systems (more widely known by the abbreviation AEB) that are designed to avoid any collision with obstacles situated in the lane taken by the vehicle by simply acting on the conventional braking system of the motor vehicle.

However, there are situations in which these emergency braking systems do not allow the collision to be avoided or cannot be used (for example if the motor vehicle is followed closely by another vehicle).

For these situations there have been developed automatic avoidance systems (more widely known by the abbreviation AES, or "Automatic Evasive Steering" or "Automatic Emergency Steering") that make it possible to avoid the obstacle by diverting the vehicle from its path, either by acting on the steering of the vehicle or by acting on the differential braking system of the vehicle.

However, it can happen that the AEB and AES systems do not allow the obstacle to be avoided with complete security.

PRESENTATION OF THE INVENTION

In order to overcome this disadvantage, the present invention proposes a method making it possible to achieve good distribution of the forces provided by the steering system and the differential braking system so as to avoid as far as possible any obstacle with complete security.

More particularly, what is proposed according to the invention is a method for generating a setpoint for controlling a steering system and a differential braking system of a motor vehicle, comprising the steps of:
  acquiring a value relating to a total yaw moment to be applied to the motor vehicle so that it follows a required path, and the speed of the motor vehicle,
  calculating, as a function of said speed, at least one threshold relating to the maximum proportion of the total yaw moment that the steering system or that the differential braking system can provide,
  determining, as a function of said threshold, a distribution rate relating to the proportion of the total yaw moment that the steering system or that the differential braking system must provide, and
  generating a setpoint for controlling the steering system and the differential braking system as a function of said distribution rate and of the value relating to the total yaw moment.

Thus, by virtue of the invention, provision is made to consider constraints allowing the steering of the vehicle to be ensured with complete security, to calculate a threshold as a function of these constraints and then to distribute the forces provided by the steering system and by the differential braking system in order to avoid as far as possible any obstacle with complete security.

Other advantageous and nonlimiting features of the method according to the invention, taken individually or according to all the technically possible combinations, are as follows:
  the threshold relates to the maximum proportion of the total yaw moment that the steering system can provide;
  the threshold is determined as a function of a maximum limit of the steering angle of the wheels of the motor vehicle;
  the threshold is determined as a function of a maximum limit of the steering speed of the wheels of the motor vehicle;
  the threshold is determined as a function of a maximum curvature of the path that the motor vehicle can follow;
  the threshold is determined as a function of a maximum angular yaw rate that the motor vehicle can endure;
  the threshold is calculated by means of a first equation:

$$\alpha_{max} = \min\left(\frac{l_f(C_f + C_r)}{C_r[(l_f + l_r)^2 + \kappa V^2]} \frac{\delta_{safety}}{\rho_{max}}, \frac{l_f(C_f + C_r)}{C_r[(l_f + l_r)^2 + \kappa V^2]} \frac{\dot{\delta}_{safety}}{\dot{\rho}_{max}}, 1\right)$$

where:

$$\kappa = m\left(\frac{l_r}{C_f} - \frac{l_f}{C_r}\right)$$

and where:
V is the speed of the motor vehicle,
$l_f$ is the distance between the center of gravity and the front axle of the motor vehicle,
$l_r$ is the distance between the center of gravity and the rear axle of the motor vehicle,
$C_f$ is the coefficient of cornering stiffness of the front wheels of the motor vehicle,
$C_r$ is the coefficient of cornering stiffness of the rear wheels of the motor vehicle,
m is the mass of the motor vehicle,
$\delta_{safety}$ is the maximum limit of the steering angle of the wheels of the motor vehicle,
$\rho_{max}$ is the maximum curvature of the path that the motor vehicle can follow,
$\dot{\delta}_{safety}$ is the maximum limit of the steering speed of the wheels of the motor vehicle,
$\dot{\rho}_{max}$ is the maximum angular yaw rate that the motor vehicle can endure;
the threshold relates to the maximum proportion of the total yaw moment that the differential braking system can provide;
the threshold is determined as a function of a maximum yaw moment limit that can be imposed by the differential braking system;
the threshold is calculated by means of a second equation:

$$\alpha_{min} = \max\left(1 - \frac{(C_f + C_r)}{C_f C_r[(l_f + l_r)^2 + \kappa V^2]} \frac{M_{DB\_sat\_act}}{\rho_{max}}, 0\right)$$

where $M_{DB\_eat\_act}$ is the maximum yaw moment limit that can be imposed by the differential braking system;

provision is made to calculate a first threshold by means of the first equation and a second threshold by means of the second equation and in which, if the first threshold is less than the second threshold:
the setpoint for controlling the steering system is chosen to be zero,
the setpoint for controlling the differential braking system is chosen to be zero,
provision is made to generate a nonzero setpoint for controlling a conventional braking system of the motor vehicle;
prior to the acquiring step, the path is determined as a function of the position of an obstacle situated in the trajectory of the motor vehicle.

Of course, the various features, variants and embodiments of the invention may be combined with one another in various combinations insofar as they are not incompatible or mutually exclusive.

DETAILED DESCRIPTION OF THE INVENTION

The description which will follow with reference to the appended drawings, given by way of nonlimiting examples, will give a good understanding of what constitutes the invention and how it can be implemented.

Figure 5:
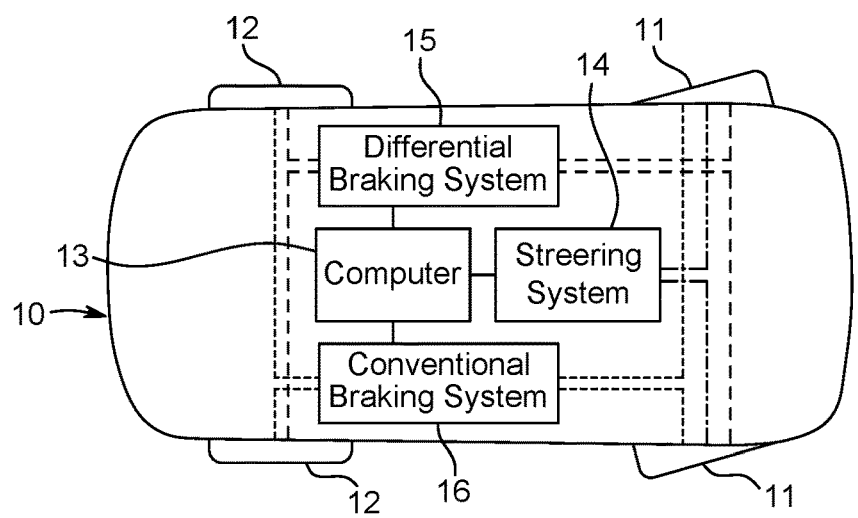
FIG. 5 is a schematic plan view of a motor vehicle.

FIG. 5 shows a motor vehicle 10 conventionally comprising a chassis which delimits a passenger compartment, two steered front wheels 11, and two nonsteered rear wheels 12. In a variant, these two rear wheels could also be steered wheels.

This motor vehicle 10 comprises a conventional steering system 14 making it possible to act on the orientation of the front wheels 11 so as to be able to turn the vehicle. This conventional steering system 14 comprises in particular a steering wheel connected to tie rods in order to pivot the front wheels 11. In the example in question, it also comprises an actuator for acting on the orientation of the front wheels as a function of the orientation of the steering wheel and/or as a function of a request received from a computer 13.

This motor vehicle 10 comprises, moreover, a conventional braking system 16 for acting on the rotational speed of the wheels so as to slow down the motor vehicle 10. This conventional braking system 16 is intended in particular for acting substantially in the same way on the two wheels 11 (and on the two rear wheels 12) such that, in a braking situation, the vehicle wholly maintains its path. This conventional braking system 16 comprises, for example, a brake pedal and brake calipers for clamping brake disks equipping the wheels. In the example in question, it also comprises an actuator for acting on the brake calipers as a function of the pressure exerted on the brake pedal and/or as a function of a request received from the computer 13.

This motor vehicle finally comprises a differential braking system 15 for acting differently on the rotational speeds of the front wheels 11 (and on those of the rear wheels 12) so as to slow down the motor vehicle while causing it to turn. This differential braking system 15 comprises, for example, a controlled differential or electric motors placed at the wheels of the vehicle. In the example in question, the controlled differential or the electric motors are controlled by the computer 13.

The computer 13 is then intended to control these various systems in a coordinated manner. It accordingly comprises at least one processor, at least one memory and various input and output interfaces.

By virtue of its input interfaces, the computer is designed to receive input signals from various sensors.

Figure 2:
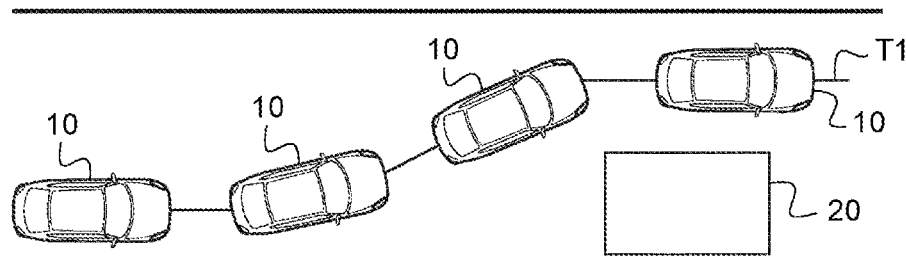
FIG. 2 is a schematic perspective view of the motor vehicle from FIG. 1, represented in four successive positions situated along another path, and of an obstacle.

Among these sensors, there are for example provided:
a device such as a front-mounted camera for locating the position of the vehicle with respect to its traffic lane,
a device such as a remote RADAR or LIDAR detector for detecting an obstacle 20 situated in the path of the motor vehicle 10 (FIG. 2),
a device such as a gyrometer for determining the rotational yaw rate (about a vertical axis) of the motor vehicle 10, and
a steering wheel angular position and speed sensor.

By virtue of its output interfaces, the computer 13 is designed to transmit requests to the aforementioned systems.

It thus makes it possible to force the vehicle to follow an avoidance path T1 and to slow down to the desired speed.

By virtue of its memory, the computer 13 stores data used within the context of the method described below.

It particularly stores a computer application in the form of computer programs comprising instructions whose execution by the processor allows the method described below to be implemented by the computer.

Figure 1:
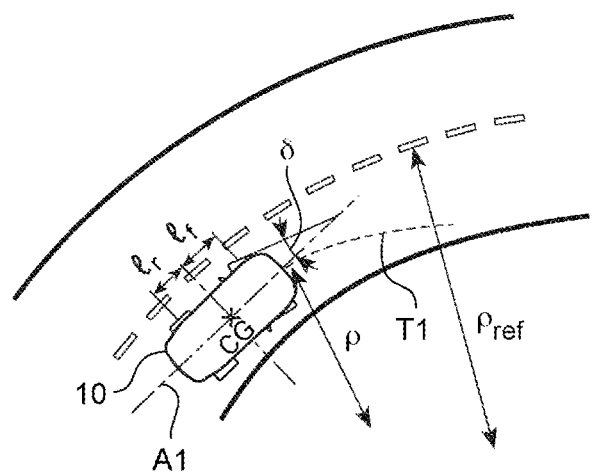
FIG. 1 is a schematic plan view of a motor vehicle traveling on a road on which the path that this vehicle can take is represented.

Before describing this method there may be introduced the different variables that will be used, some of which are illustrated in FIG. 1.

The total mass of the motor vehicle will be denoted "m" and will be expressed in kg.

The inertia of the motor vehicle about a vertical axis passing through its center of gravity CG will be denoted "J" and will be expressed in kg·m².

The distance between the center of gravity CG and the front axle of the vehicle will be denoted "$l_f$" and will be expressed in meters.

The distance between the center of gravity CG and the rear axle will be denoted "$l_r$" and will be expressed in meters.

The coefficient of cornering stiffness of the front wheels will be denoted "$C_f$" and will be expressed in N/rad.

The coefficient of cornering stiffness of the rear wheels will be denoted "$C_r$" and will be expressed in N/rad.

These coefficients of cornering stiffness of the wheels are well-known notions to a person skilled in the art. By way of example, the coefficient of cornering stiffness of the front wheels is thus that allowing the equation $F_f = 2 \cdot C_f \cdot \alpha_f$ to be written, where $F_f$ is the lateral slip force of the front wheels and $\alpha_f$ is the drift angle of the front wheels.

The steering angle that the steered front wheels makes with the longitudinal axis A1 of the motor vehicle 10 will be denoted "$\delta$" and will be expressed in rad.

The yaw rate of the vehicle (about the vertical axis passing through its center of gravity CG) will be denoted "r" and will be expressed in rad/s.

The relative heading angle between the longitudinal axis A1 of the vehicle and the tangent to the avoidance path T1 (desired path of the vehicle) will be denoted "$\Psi_L$" and will be expressed in rad.

The lateral offset between the longitudinal axis A1 of the motor vehicle 10 (passing through the center of gravity CG) and the avoidance path T1, at a sighting distance "ls" situated in front of the vehicle, will be denoted "$e_{yL}$" and will be expressed in meters.

The aforementioned sighting distance "ls" will be measured from the center of gravity CG and will be expressed in meters.

The drift angle of the motor vehicle 10 (angle that the speed vector of the motor vehicle makes with its longitudinal axis A1) will be denoted "β" and will be expressed in rad.

The speed of the motor vehicle along the longitudinal axis A1 will be denoted "V" and will be expressed in m/s.

The curvature of the avoidance path T1 will be denoted ρ and will be expressed in m$^{-1}$.

The average curvature of the traffic lane will be denoted $\rho_{ref}$ and will be expressed in m$^{-1}$.

The total yaw moment to be applied to the motor vehicle 10 such that it follows the required avoidance path T1 will be denoted "$M_{Yaw\_total}$" and will be expressed in Nm.

The component of this total yaw moment $M_{Yaw\_total}$ executed using the differential braking system 15 alone will be denoted "$M_{DB}$" and will be expressed in Nm.

Before describing the method that will be executed by the computer to implement the invention, a description may be given in a first part of this account of the calculations which have made it possible to arrive at the invention so as to give a clear understanding of where these calculations originate and on what foundations they are based.

By way of preliminary comment, it will be considered here that the total yaw moment $M_{Yaw\_total}$ making it possible to follow the avoidance path T1 (or at least to minimize the lateral offset $e_{yL}$) can be modeled in the following way:

$$\begin{pmatrix} \dot{\beta} \\ \dot{r} \\ \dot{\psi}_L \\ \dot{e}_{yL} \end{pmatrix} = \begin{bmatrix} -\dfrac{C_f + C_r}{mV} & -1 + \dfrac{C_r l_r - C_f l_f}{mV^2} & 0 & 0 \\ -\dfrac{C_f l_f - C_r l_r}{J} & -\dfrac{C_r l_r^2 + C_f l_f^2}{JV} & 0 & 0 \\ 0 & 1 & 0 & 0 \\ V & l_s & V & 0 \end{bmatrix} \begin{pmatrix} \beta \\ r \\ \psi_L \\ e_{yL} \end{pmatrix} + \begin{bmatrix} 0 \\ \dfrac{1}{J} \\ 0 \\ 0 \end{bmatrix} M_{Yaw\_total}$$

[Math 1]

The objective of the invention is that of ensuring that the differential braking system 15 and steering system 14 are commanded in a way that allows the motor vehicle 10 to follow an avoidance path T1 passing beside an obstacle detected in its trajectory and that can be followed with complete security by the motor vehicle 10.

To achieve that, the first constraint to be imposed on the vehicle control algorithm is that it is necessary for this avoidance path T1 to be less curved than the maximum avoidance path beyond which there would be a risk of losing control of the motor vehicle 10. This maximum avoidance path, which depends on the speed V of the motor vehicle 10, is assumed to be known and is defined by a maximum avoidance path curve and by a maximum yaw rate, which can be written in the form of the following equations:

$$\rho \leq \rho_{max} \qquad [\text{Math 2}]$$

$$\dot{\rho} \leq \dot{\rho}_{max} \qquad [\text{Math 3}]$$

It will be noted here that the maximum avoidance path curve and the maximum yaw rate depend on the speed V of the motor vehicle 10.

If the first two lines of the equation Math 1 are considered, the following can be written:

$$\begin{pmatrix} \dot{\beta} \\ \dot{r} \end{pmatrix} = \begin{bmatrix} -\dfrac{C_f + C_r}{mV} & -1 + \dfrac{C_r l_r - C_f l_f}{mV^2} \\ -\dfrac{C_f l_f - C_r l_r}{J} & -\dfrac{C_r l_r^2 + C_f l_f^2}{JV} \end{bmatrix} \begin{pmatrix} \beta \\ r \end{pmatrix} + \begin{bmatrix} 0 \\ \dfrac{1}{J} \end{bmatrix} M_{Yaw\_total}$$

[Math 4]

In steady (or "static") state, this equation can be written:

$$\begin{cases} a_{11}\beta + a_{12}r = 0 \\ a_{21}\beta + a_{22}r + b_2 M_{Yaw\_total\_static} = 0 \end{cases} \qquad [\text{Math 5}]$$

In this equation, the coefficients can be calculated in the following way:

$$a_{11} = -\dfrac{C_f + C_r}{mV} \qquad [\text{Math 6}]$$

$$a_{22} = -\dfrac{C_r l_r^2 + C_f l_f^2}{JV}$$

$$a_{12} = -1 + \dfrac{C_r l_r - C_f l_f}{mV^2}$$

$$a_{21} = -\dfrac{C_f l_f - C_r l_r}{J}$$

$$b_2 = \dfrac{1}{J}$$

The resolution of the equation Math 5 makes it possible to write:

$$M_{Yaw\_total\_static} = \dfrac{a_{21} a_{12} - a_{11} a_{22}}{a_{11} b_2} r \qquad [\text{Math 7}]$$

Or alternatively:

$$M_{Yaw\_total\_static} = \dfrac{C_f C_r [(l_f + l_r)^2 + \kappa V^2]}{(C_f + C_r) V} r \qquad [\text{Math 8}]$$

In this equation, the coefficient κ can be written:

$$\kappa = m \left( \dfrac{l_r}{C_f} - \dfrac{l_f}{C_r} \right) \qquad [\text{Math 9}]$$

The yaw rate r can be estimated by the equation:

$$r = \rho \cdot v \qquad [\text{Math 10}]$$

With the result that there can be written:

$$M_{Yaw\_total\_static} = -\frac{C_f C_r [(l_f + l_r)^2 + \kappa V^2]}{(C_f + C_r)} \rho \qquad \text{[Math 11]}$$

This equation, combined with the two conditions stated by the equations Math 2 and Math 3, makes it possible to write the following two conditions:

$$sup(M_{Yaw\_total}) = \frac{C_f C_r [(l_f + l_r)^2 + \kappa V^2]}{(C_f + C_r)} \rho_{max} \qquad \text{[Math 12]}$$

$$sup(\dot{M}_{Yaw\_total}) = \frac{C_f C_r [(l_f + l_r)^2 + \kappa V^2]}{(C_f + C_r)} \dot{\rho}_{max} \qquad \text{[Math 13]}$$

To write these two equations, it is assumed that $M_{Yaw\_total}$ is less than $M_{Yaw\_total\_static}$. It is also assumed that the same is true for their derivatives.

At this stage, the motor vehicle 10 can be modeled as a function of the component of the yaw moment $M_{DB}$, by means of the following equation:

$$\begin{pmatrix} \dot{\beta} \\ \dot{r} \\ \dot{\psi}_L \\ \dot{e}_{yL} \end{pmatrix} = \begin{bmatrix} -\frac{C_f + C_r}{mV} & -1 + \frac{C_r l_r - C_f l_f}{mV^2} & 0 & 0 \\ -\frac{C_f l_f - C_r l_r}{J} & -\frac{C_r l_r^2 + C_f l_f^2}{JV} & 0 & 0 \\ 0 & 1 & 0 & 0 \\ V & l_s & V & 0 \end{bmatrix} \begin{pmatrix} \beta \\ r \\ \psi_L \\ e_{yL} \end{pmatrix} + \begin{bmatrix} \frac{C_f}{mV} \\ \frac{C_f l_f}{J} \\ 0 \\ 0 \end{bmatrix} \delta + \begin{bmatrix} 0 \\ \frac{1}{J} \\ 0 \\ 0 \end{bmatrix} M_{DB} \qquad \text{[Math 14]}$$

The second line of this equation thus makes it possible to write:

$$J\dot{r} = -(C_f l_f - C_r l_r)\beta - \frac{C_r l_r^2 + C_f l_f^2}{V} r + C_f l_f \delta + M_{DB} \qquad \text{[Math 15]}$$

At this stage, it can be assumed that the drift angle β corresponding to the slip of the vehicle on the road is zero. It is then possible to write, in association with the equation Math 1:

$$M_{Yaw\_total} = C_f l_f \delta + M_{DB} \qquad \text{[Math 16]}$$

This equation clearly illustrates the distribution of the total yaw moment $M_{Yaw\_total}$ between, on the one hand, the component $M_{DB}$ provided by the differential braking system 15 and the component $C_f L_f \delta$ provided by the conventional steering system 14.

It is thus possible to write the following two equations:

$$\delta = \alpha_R \frac{M_{Yaw\_total}}{C_f l_f} \qquad \text{[Math 17]}$$

$$M_{DB} = (1 - \alpha_R) M_{Yaw\_total} \qquad \text{[Math 18]}$$

In these equations, the coefficient $\alpha_R$ corresponds to the "repair rate" between the two aforementioned components.

This distribution rate $\alpha_R$ corresponds more precisely to the percentage of the total yaw moment $M_{Yaw\_total}$ that is provided by the conventional steering system 14. The complement of this percentage corresponds for its part to the percentage of the total yaw moment $M_{Yaw\_total}$ that is provided by the differential braking system 15.

With regard to this distribution rate $\alpha_R$, it is of course possible to write:

$$0 \leq \alpha_R \leq 1 \qquad \text{[Math 19]}$$

At this stage, it is desired moreover to fix a second and a third constraint to be imposed on the control algorithm of the motor vehicle 10 to ensure that any driver is in a position of being able to assume control of this vehicle at any time. These other two constraints relate to a maximum value of the steering angle and to a maximum angular steering speed (that is to say a rotational speed of the wheels about a vertical axis) beyond which it would be difficult for a driver to assume control of the vehicle with complete security. These two constraints can be written in the following form:

$$\delta \leq \delta_{safety} \qquad \text{[Math 20]}$$

$$\dot{\delta} \leq \dot{\delta}_{safety} \qquad \text{[Math 21]}$$

It will be noted here that the maximum value of the steering angle and the maximum angular steering speed can depend on the speed V of the motor vehicle 10.

It is also desired to fix a fourth constraint to be imposed on the control algorithm of the motor vehicle 10, consisting in providing a differential braking torque to all the wheels 11, 12 that is less than a saturation threshold (beyond which the wheels would skid), which can be written:

$$M_{DB} \leq M_{DB\_sat\_act} \qquad \text{[Math 22]}$$

It will be noted here that this saturation threshold may vary as a function, for example, of the speed V of the motor vehicle 10.

The combination of the equations Math 12, Math 13 and Math 17 thus makes it possible to write the equations:

$$sup(\delta) \sim \alpha_R \frac{C_r[(l_f + l_r)^2 + \kappa V^2]}{l_f(C_f + C_r)} \rho_{max} \qquad \text{[Math 23]}$$

$$sup(\dot{\delta}) \sim \frac{\alpha_R C_r[(l_f + l_r)^2 + \kappa V^2]}{l_f(C_f + C_r)} \dot{\rho}_{max} \qquad \text{[Math 24]}$$

To ensure the coherence of the equations Math 20 and Math 23 on the one hand, and that of the equations Math 21 and Math 24 on the other hand, the distribution rate $\alpha_R$ must then comply with the condition below:

$$\alpha_R \leq \bar{\alpha} = \min\left(\frac{l_f(C_f + C_r)}{C_r[(l_f + l_r)^2 + \kappa V^2]} \frac{\delta_{safety}}{\rho_{max}}, \frac{l_f(C_f + C_r)}{C_r[(l_f + l_r)^2 + \kappa V^2]} \frac{\dot{\delta}_{safety}}{\dot{\rho}_{max}}, 1\right) \qquad \text{[Math 25]}$$

$\bar{\alpha}$, also denoted $\alpha_{max}$, being an upper threshold for the distribution rate $\alpha_R$.

The equations Math 12, Math 18 and Math 22 also make it possible to write:

$$\alpha_R \geq \underline{\alpha} = \max\left(1 - \frac{(C_f + C_r)}{C_f C_r [(l_f + l_r)^2 + \kappa V^2]} \frac{M_{DB\_sat\_act}}{\dot{\rho}_{max}}, 0\right) \quad [\text{Math 26}]$$

$\underline{\alpha}$, also denoted $\alpha_{min}$, being a minimum threshold for the distribution rate $\alpha_R$.

It will also be understood that this threshold must satisfy the equation:

$$\overline{\alpha} \geq \underline{\alpha} \quad [\text{Math 27}]$$

In order to ensure the feasibility of the distribution of the yaw moment between the differential braking system and the conventional steering system, it is therefore necessary for the distribution rate $\alpha_R$ to be chosen in order to be comprised between these two thresholds $\alpha_{min}$, $\alpha_{max}$. To illustrate this condition graphically, the three mathematical functions f, g and h can be introduced.

The first function f corresponds to a first upper limit of the distribution rate $\alpha_R$, which is associated with the limit of the steering angle $\delta$ that has been imposed. This first function can be written:

$$f_\delta(V) = \frac{l_f(C_f + C_r)}{C_r[(l_f + l_r)^2 + \kappa V^2]} \frac{\delta_{safety}}{\dot{\rho}_{max}} \quad [\text{Math 28}]$$

The second function g corresponds to another upper limit of the distribution rate $\alpha_R$, which is this time associated with the angular steering speed limit that has been imposed. This second function can be written:

$$g_\delta(V) = \frac{l_f(C_f + C_r)}{C_r[(l_f + l_r)^2 + \kappa V^2]} \frac{\dot{\delta}_{safety}}{\dot{\rho}_{max}} \quad [\text{Math 29}]$$

The third function h corresponds to a lower limit of the distribution rate $\alpha_R$, which is associated with the yaw moment limit that can be imposed by the differential braking system 15. This third function can be written:

$$h_{M_{DB}}(V) = 1 - \frac{(C_f + C_r)}{C_f C_r[(l_f + l_r)^2 + \kappa V^2]} \frac{M_{DB\_sat\_act}}{\dot{\rho}_{max}} \quad [\text{Math 30}]$$

Figure 3:
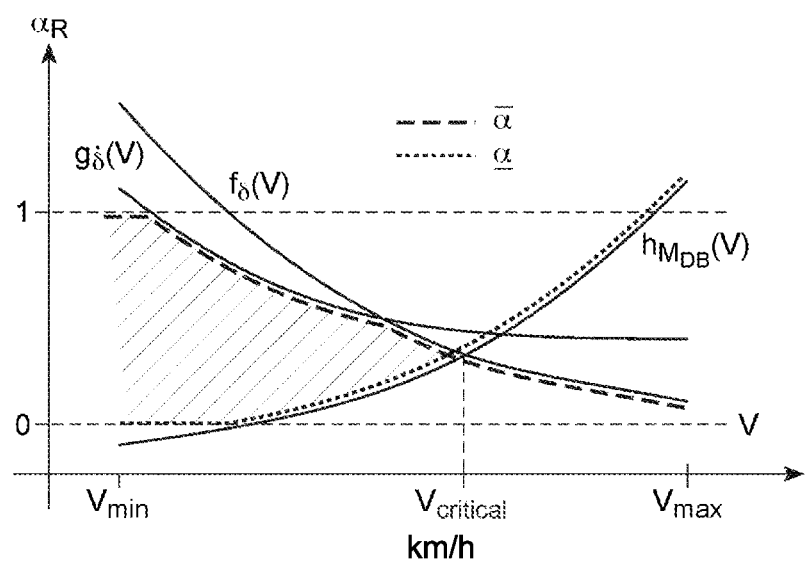
FIG. 3 is a graph illustrating the thresholds between which the distribution rate $\alpha_R$ must be chosen.

An example of illustration of these three mathematical functions f, g, h is given in FIG. 3.

In this example, the hatched part corresponds to the region in which it is possible to choose the distribution rate $\alpha_R$ in such a way that all the constraints that are imposed on the algorithm are satisfied.

It will thus be understood that this distribution rate must be chosen to be between 0 and 1, and so as to be less than the first and second mathematical functions f, g and greater than the third mathematical function h.

It will be observed in this FIG. 3 that there is a critical speed $V_{critical}$ beyond which it is not possible to find a distribution rate $\alpha_R$ ensuring all the desired constraints.

When one finds oneself in this scenario, it is then first of all envisioned to carry out emergency braking of the vehicle in a straight line using the conventional braking system 16 alone until the speed V of the motor vehicle 10 is less than or equal to the critical speed $V_{critical}$. Then, a distribution rate comprised between the three mathematical functions is selected to ensure that the obstacle is avoided by the motor vehicle.

Figure 4:
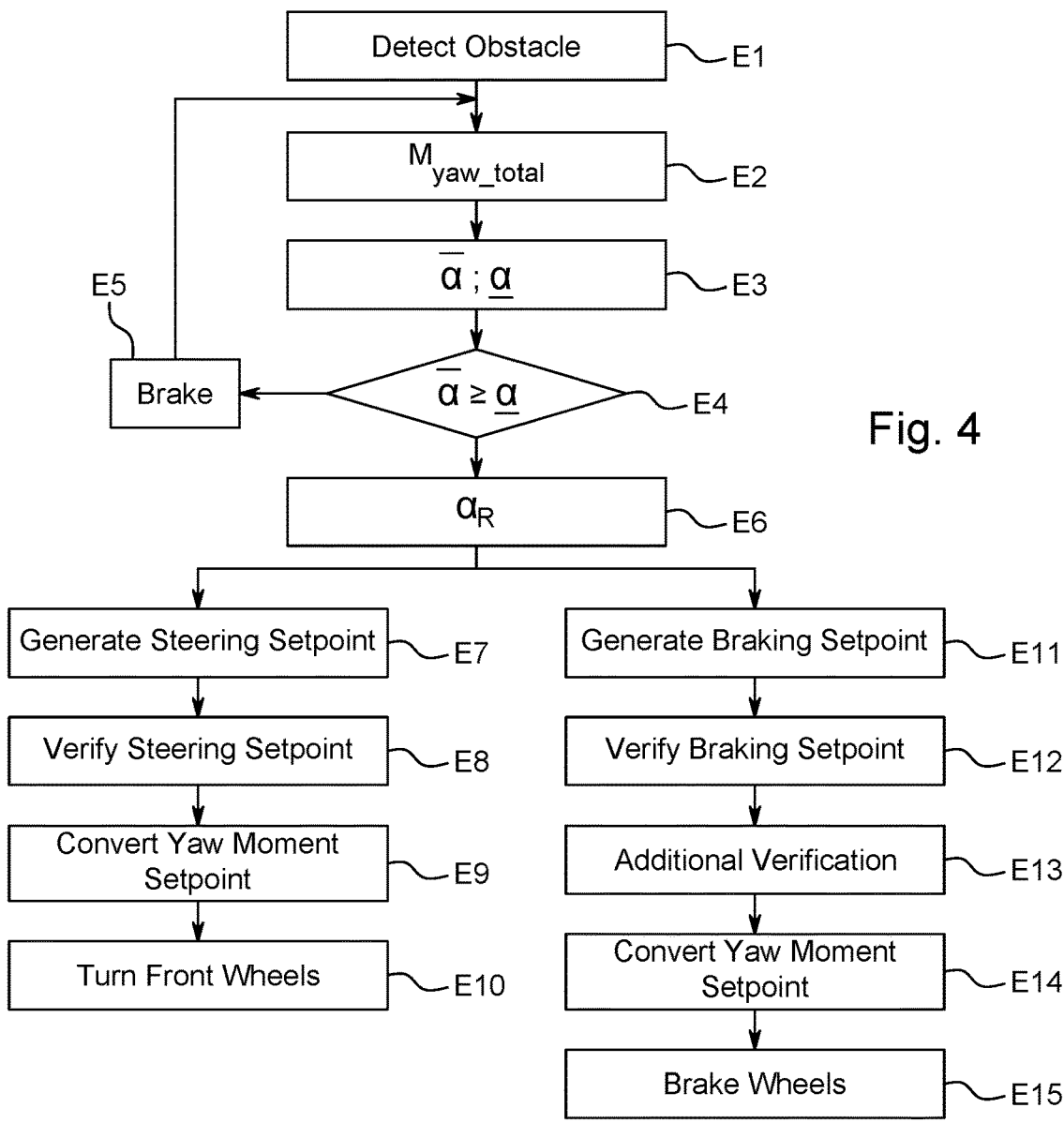
FIG. 4 is a flowchart illustrating an example of an algorithm for implementing the method according to the invention.

At this stage, now that the four constraints imposed on the vehicle are known and now that the origin of the equations Math 25 and Math 26 is explained, there can be given an example of embodiment of a method for generating a setpoint for controlling the motor vehicle according to the invention, with reference to FIG. 4.

The computer 13 is here programmed to implement this method in a recursive manner, that is to say step by step, and in a loop.

For that purpose, during a first step E1, the computer 13 attempts to detect the presence of a potential obstacle situated in the trajectory of the motor vehicle 10. To do that it uses its remote RADAR or LIDAR detector.

In the absence of an obstacle, this step E1 is repeated in loops.

As soon as an obstacle 20 is detected (see FIG. 2), the computer 13 plans an avoidance path T1 allowing this obstacle 20 to be avoided.

The computer 13 will then seek to define control setpoints for the conventional braking system 16, the differential braking system 15 and the conventional steering system 14.

For that purpose, during a second step E2, the computer 13 first of all determines the value of the total yaw moment $M_{Yaw\_total}$ to be applied to the vehicle such that it can follow the avoidance path T1.

The manner of calculating the value of the total yaw moment $M_{Yaw\_total}$ will not be described here, since it does not in its own right form the subject matter of the present invention. It may simply be recalled that various methods of calculating this value are already well known. Use may be made for example of a conventional PID controller, an MPC control ("model predictive control") or else any other strategy known from the prior art.

During a third step E3, the computer 13 determines the maximum threshold $\alpha_{max}$ and minimum threshold $\alpha_{min}$ that the distribution rate $\alpha_R$ can assume.

For that purpose, the computer records the speed V of the motor vehicle 10 and then it uses the equations Math 25 and Math 26 to determine these values.

It will be observed that the values of the variables useful for these calculations will at this stage be known and stored in the memory of the computer (some of them themselves depend on the speed V). They will for example have been able to be determined during a test campaign performed on a vehicle of the same type as the one considered here.

During a fourth step E4, the computer determines if the calculated maximum threshold $\alpha_{max}$ is much greater than the minimum threshold $\alpha_{min}$.

If this is not the case, which means that the motor vehicle 10 is traveling at a higher speed than the critical speed $V_{critical}$, the computer 13 commands the braking of the motor vehicle 10 by means of the conventional braking system 16 (step E5). The method then starts again at step E2.

In the converse case, the computer 13 chooses a distribution rate $\alpha_R$ that is comprised between these two thresholds and also between 0 and 1 (step E6).

For that purpose, if the speed of the vehicle is low (that is to say if the calculated maximum threshold $\alpha_{max}$ is close to 1 or equal to 1, and if the minimum threshold $\alpha_{min}$ is close to 0 or equal to 0), a distribution rate $\alpha_R$ equal to 1 can be chosen so as to favor the use of the conventional steering system 14 to turn the vehicle such that it follows the avoidance path T1.

If the speed of the vehicle is substantially higher, it is possible on the other hand to favor the use of the differential braking system 15.

By way of example, if the speed V of the vehicle is less than 50 km/h, the distribution rate $\alpha_R$ can be fixed at 1.

If the speed V of the vehicle is comprised between 50 and 160 km/h (considered in this example as the critical speed $V_{critical}$), the distribution rate $\alpha_R$ can be fixed to a value of less than 1 (and especially less than 1 when the speed is high).

Thus, the law of distribution between the conventional steering system 14 and the differential braking system 15 is directly associated with the physical limits of the motor vehicle 10. Specifically, the braking torque must be limited to satisfy the constraints associated with the limit of the actuator.

Finally, during steps E7 and E11, the computer respectively generates a setpoint for controlling the steering system 14 and a setpoint for controlling the differential braking system 15 as a function of the chosen distribution rate $\alpha_R$ and of the total yaw moment $M_{Yaw\_total}$.

In step E8, the computer 13 verifies that the setpoint for controlling the steering system 14 correctly conforms to the controllability limits defined by the assisted steering actuator of the conventional steering system 14. Specifically, these controllability limits are manifested by the fact that the steering angle and the steering speed must be limited so that the driver can always take back manual control of the steering wheel.

In step E9, the computer 13 converts the yaw moment setpoint into a setpoint adapted to the actuator.

In step E10, the actuator causes the front wheels 11 of the vehicle to turn as a function of this setpoint.

In parallel, in step E12, the computer 13 verifies that the setpoint for controlling the differential braking system 15 correctly conforms to the controllability limits defined by this system.

In step E13, the computer 13 additionally verifies that this same setpoint for controlling the differential braking system 15 correctly conforms to the controllability limits defined by the other safety systems of the vehicle, in particular by the VMC ("Vehicle Motion Control") system and VDC ("Vehicle Dynamics Control") system. It also verifies that this setpoint is applicable given the braking capacities of each tire.

In step E14, the computer 13 converts the yaw moment setpoint into a setpoint adapted to the system used (controlled differential or electric motors).

In step E15, the system used brakes the wheels 11, 12 of the vehicle as a function of this setpoint.

The present invention is in no way limited to the embodiment described and represented, but a person skilled in the art will be able to apply thereto any variant according to the invention.

Thus, the invention may be applied to any type of braking system and to any type of steering system, using actuators, for example electric or hydraulic actuators (for example with a regenerative braking system).

The invention is independent of the ESP ("Electronic Stability Program") electronic path correction strategies that would already be present in the computer 13. For example, when the ESP is activated, the method for generating a control setpoint according to the invention is not activated. Nor does the method for generating a control setpoint according to the invention in any case trigger the ESP. Specifically, with the most dynamic avoidance path being taken into consideration in the method according to the invention, that makes it possible not to encroach in the correction dynamics of the ESP.

The invention claimed is:

1. A method for generating a setpoint for controlling a steering system and a differential braking system of a motor vehicle, comprising:
acquiring a value relating to a total yaw moment to be applied to the motor vehicle so that the motor vehicle follows a required path, and a speed of the motor vehicle;
calculating, as a function of said speed, at least one threshold relating to a maximum proportion of the total yaw moment that the steering system or that the differential braking system is configured to provide;
determining, as a function of said threshold, a distribution rate relating to the maximum proportion of the total yaw moment that the steering system or that the differential braking system must provide; and
generating a setpoint for controlling the steering system and the differential braking system as a function of said distribution rate and of the value relating to the total yaw moment.

2. The method as claimed in claim 1, in which the threshold relates to the maximum proportion of the total yaw moment that the steering system is configured to provide and is determined as a function of a maximum limit of a steering angle of wheels of the motor vehicle.

3. The method as claimed in claim 2, in which said threshold is calculated by a first equation:

$$\alpha_{max} = \min\left(\frac{l_f(C_f + C_r)}{C_r[(l_f + l_r)^2 + \kappa V^2]} \frac{\delta_{safety}}{\rho_{max}}, \frac{l_f(C_f + C_r)}{C_r[(l_f + l_r)^2 + \kappa V^2]} \frac{\dot{\delta}_{safety}}{\dot{\rho}_{max}}, 1\right)$$

where:

$$\kappa = m\left(\frac{l_r}{C_f} - \frac{l_f}{C_r}\right)$$

and where:
V is the speed of the motor vehicle,
$l_f$ is a distance between a center of gravity and a front axle of the motor vehicle,
$l_r$ is a distance between the center of gravity and a rear axle of the motor vehicle,
$C_f$ is a coefficient of cornering stiffness of front wheels of the motor vehicle,
$C_r$ is a coefficient of cornering stiffness of rear wheels of the motor vehicle,
m is a mass of the motor vehicle,
$\delta_{safety}$ is the maximum limit of the steering angle of the wheels of the motor vehicle,
$\rho_{max}$ is a maximum curvature of the path that the motor vehicle can follow,
$\dot{\delta}_{safety}$ is a maximum limit of the steering speed of the wheels of the motor vehicle,
$\dot{\rho}_{max}$ is a maximum angular yaw rate that the motor vehicle can endure.

4. The method as claimed in claim 1, in which the threshold relates to the maximum proportion of the total yaw moment that the steering system is configured to provide and is determined as a function of a maximum limit of a steering speed of wheels of the motor vehicle.

5. The method as claimed in claim 4, in which said threshold is calculated by a first equation:

$$\alpha_{max} = \min\left(\frac{l_f(C_f + C_r)}{C_r[(l_f + l_r)^2 + \kappa V^2]} \frac{\delta_{safety}}{\rho_{max}}, \frac{l_f(C_f + C_r)}{C_r[(l_f + l_r)^2 + \kappa V^2]} \frac{\dot{\delta}_{safety}}{\dot{\rho}_{max}}, 1\right)$$

where:

$$\kappa = m\left(\frac{l_r}{C_f} - \frac{l_f}{C_r}\right)$$

and where:

V is the speed of the motor vehicle, $l_f$ is a distance between a center of gravity and a front axle of the motor vehicle, $l_r$ is a distance between the center of gravity and a rear axle of the motor vehicle, $C_f$ is a coefficient of cornering stiffness of front wheels of the motor vehicle, $C_r$ is a coefficient of cornering stiffness of rear wheels of the motor vehicle, m is a mass of the motor vehicle, $\delta_{safety}$ is a maximum limit of a steering angle of the wheels of the motor vehicle, $\rho_{max}$ is a maximum curvature of the path that the motor vehicle can follow, $\dot{\delta}_{safety}$ is the maximum limit of the steering speed of the wheels of the motor vehicle, $\dot{\rho}_{max}$ is a maximum angular yaw rate that the motor vehicle can endure.

6. The method as claimed in claim 1, in which the threshold relates to the maximum proportion of the total yaw moment that the steering system is configured to provide and is determined as a function of a maximum curvature of the path that the motor vehicle can follow.

7. The method as claimed in claim 6, in which said threshold is calculated by a first equation:

$$\alpha_{max} = \min\left(\frac{l_f(C_f + C_r)}{C_r[(l_f + l_r)^2 + \kappa V^2]} \frac{\delta_{safety}}{\rho_{max}}, \frac{l_f(C_f + C_r)}{C_r[(l_f + l_r)^2 + \kappa V^2]} \frac{\dot{\delta}_{safety}}{\dot{\rho}_{max}}, 1\right)$$

where:

$$\kappa = m\left(\frac{l_r}{C_f} - \frac{l_f}{C_r}\right)$$

and where:

V is the speed of the motor vehicle, $l_f$ is a distance between a center of gravity and a front axle of the motor vehicle, $l_r$ is a distance between the center of gravity and a rear axle of the motor vehicle, $C_f$ is a coefficient of cornering stiffness of front wheels of the motor vehicle, $C_r$ is a coefficient of cornering stiffness of rear wheels of the motor vehicle, m is a mass of the motor vehicle, $\delta_{safety}$ is a maximum limit of a steering angle of the wheels of the motor vehicle, $\rho_{max}$ is the maximum curvature of the path that the motor vehicle can follow, $\dot{\delta}_{safety}$ is a maximum limit of a steering speed of the wheels of the motor vehicle, $\dot{\rho}_{max}$ is a maximum angular yaw rate that the motor vehicle can endure.

8. The method as claimed in claim 1, in which the threshold relates to the maximum proportion of the total yaw moment that the steering system is configured to provide and is determined as a function of a maximum angular yaw rate that the motor vehicle can endure.

9. The method as claimed in claim 8, in which said threshold is calculated by a first equation:

$$\alpha_{max} = \min\left(\frac{l_f(C_f + C_r)}{C_r[(l_f + l_r)^2 + \kappa V^2]} \frac{\delta_{safety}}{\rho_{max}}, \frac{l_f(C_f + C_r)}{C_r[(l_f + l_r)^2 + \kappa V^2]} \frac{\dot{\delta}_{safety}}{\dot{\rho}_{max}}, 1\right)$$

where:

$$\kappa = m\left(\frac{l_r}{C_f} - \frac{l_f}{C_r}\right)$$

and where:

V is the speed of the motor vehicle, $l_f$ is a distance between a center of gravity and a front axle of the motor vehicle, $l_r$ is a distance between the center of gravity and a rear axle of the motor vehicle, $C_f$ is a coefficient of cornering stiffness of front wheels of the motor vehicle, $C_r$ is a coefficient of cornering stiffness of rear wheels of the motor vehicle, m is a mass of the motor vehicle, $\delta_{safety}$ is a maximum limit of a steering angle of the wheels of the motor vehicle, $\rho_{max}$ is a maximum curvature of the path that the motor vehicle can follow, $\dot{\delta}_{safety}$ is a maximum limit of a steering speed of the wheels of the motor vehicle, $\dot{\rho}_{max}$ is the maximum angular yaw rate that the motor vehicle can endure.

10. The method as claimed in claim 1, in which the threshold relates to the maximum proportion of the total yaw moment that the differential braking system is configured to provide and is determined as a function of a maximum yaw moment limit that can be imposed by the differential braking system.

11. The method as claimed in claim 10, in which the threshold is calculated by a second equation:

$$\alpha_{min} = \max\left(1 - \frac{(C_f + C_r)}{C_f C_r[(l_f + l_r)^2 + \kappa V^2]} \frac{M_{DB\_sat\_act}}{\rho_{max}}, 0\right)$$

where:

$$\kappa = m\left(\frac{l_r}{C_f} - \frac{l_f}{C_r}\right)$$

and where:

V is the speed of the motor vehicle, $l_f$ is a distance between a center of gravity and a front axle of the motor vehicle, $l_r$ is a distance between the center of gravity and a rear axle of the motor vehicle, $C_f$ is a coefficient of cornering stiffness of front wheels of the motor vehicle, $C_r$ is a coefficient of cornering stiffness of rear wheels of the motor vehicle, m is a mass of the motor vehicle, $M_{DB\_sat\_act}$ is the maximum yaw moment limit that can be imposed by the differential braking system, $\rho_{max}$ is a maximum curvature of the path that the motor vehicle can follow.

12. The method as claimed in claim 1, further comprising:

calculating a first threshold of the at least one threshold by a first equation:

$$a_{max} = \min\left(\frac{l_f(C_f + C_r)}{C_r[(l_f + l_r)^2 + \kappa V^2]} * \frac{\delta_{safety}}{\rho_{max}}, \frac{l_f(C_f + C_r)}{C_r[(l_f + l_r)^2 + \kappa V^2]} * \frac{\dot{\delta}_{safety}}{\dot{\rho}_{max}}, 1\right)$$

where:

$$\kappa = m\left(\frac{l_r}{C_f} - \frac{l_f}{C_r}\right)$$

and where:
V is the speed of the motor vehicle,
$l_f$ is a distance between a center of gravity and a front axle of the motor vehicle,
$l_r$ is a distance between the center of gravity and a rear axle of the motor vehicle,
$C_f$ is a coefficient of cornering stiffness of front wheels of the motor vehicle,
$C_r$ is a coefficient of cornering stiffness of rear wheels of the motor vehicle,
m is a mass of the motor vehicle,
$\delta_{safety}$ is a maximum limit of a steering angle of the wheels of the motor vehicle,
$\rho_{max}$ is a maximum curvature of the path that the motor vehicle can follow,
$\dot{\delta}_{safety}$ is a maximum limit of a steering speed of the wheels of the motor vehicle,
$\dot{\rho}_{max}$ is a maximum angular yaw rate that the motor vehicle can endure; and
calculating a second threshold of the at least one threshold by a second equation:

$$a_{min} = \max\left(1 - \frac{(C_f + C_r)}{C_f C_r[(l_f + l_r)^2 + \kappa V^2]} \frac{M_{DB\_sat\_act}}{\rho_{max}}, 0\right)$$

where:

$$\kappa = m\left(\frac{l_r}{C_f} - \frac{l_f}{C_r}\right)$$

and where:
$M_{DB\_sat\_act}$ is the maximum yaw moment limit that can be imposed by the differential braking system,
$\rho_{max}$ is a maximum curvature of the path that the motor vehicle can follow, in which, when the first threshold is less than the second threshold:
  the setpoint for controlling the steering system is chosen to be zero,
  the setpoint for controlling the differential braking system is chosen to be zero, and
  provision is made to generate a nonzero setpoint for controlling a conventional braking system of the motor vehicle.

13. The method as claimed in claim 1, in which, prior to the acquiring, the path is determined as a function of a position of an obstacle situated in a trajectory of the motor vehicle.

\* \* \* \* \*